US00RE35757E

United States Patent [19]

Heavner

[11] E Patent Number: Re. 35,757

[45] Reissued Date of Patent: Mar. 31, 1998

[54] SPLIT WINDSHIELD ASSEMBLY FOR RECREATION VEHICLE

[75] Inventor: Edward J. Heavner, Concord, N.C.

[73] Assignee: Plastics Manufacturing, Inc., Harrisburg, N.C.

[21] Appl. No.: 551,309

[22] Filed: Nov. 1, 1995

Related U.S. Patent Documents

Reissue of:

[64] Patent No.: 5,385,380
Issued: Jan. 31, 1995
Appl. No.: 131,654
Filed: Oct. 5, 1993

[51] Int. Cl.[6] ..... B60J 1/04

[52] U.S. Cl. ..... 296/84.1; 296/77.1; 296/86; 280/DIG. 5

[58] Field of Search ..... 296/84.1, 77.1, 296/86, 79, 87, 88, 96.21, 96.2; 280/DIG. 5

[56] References Cited

U.S. PATENT DOCUMENTS 4,773,695 9/1988 Jones et al. ..... 296/77.1
5,195,797 3/1993 Hobbs ..... 296/77.1

*Primary Examiner*—Joseph D. Pape
*Attorney, Agent, or Firm*—Adams Law Firm, P.A.

[57] ABSTRACT

An improved split windshield assembly includes a retainer clip constructed of a flexible material, and a flexible, hollow clamp. The clip is for being attached to an upper portion of at least one of the front support posts of a recreation vehicle for releasably holding the upper windshield panel in a closed position. The hollow clamp has a base, and first and second hollow arms. The base is fixedly attached to the lower windshield panel at a lower portion thereof. The first and second hollow arms have opposed, closely spaced-apart inside surfaces which define a longitudinally-extending, windshield-holding channel. The windshield-holding channel engages and holds a curved top edge of the upper windshield panel when the upper windshield panel is in the open position.

27 Claims, 8 Drawing Sheets

SPLIT WINDSHIELD ASSEMBLY FOR RECREATION VEHICLE

Matter enclosed in heavy brackets [ ] appears in the original patent but forms no part of this reissue specification; matter printed in italics indicates the additions made by reissue.

TECHNICAL FIELD AND BACKGROUND OF THE INVENTION

This invention relates to a windshield assembly for attachment to a recreation vehicle, such as a golf cart. The invention relates particularly a windshield assembly including an improved means for attaching the windshield to the golf cart.

Most conventional golf carts have a canopy supported by a pair of front and back support posts. Additionally, these golf carts generally include a split windshield having an upper panel and lower panel connected together by a hinge. Various attachment devices serve to attach the split windshield to the front support posts of the golf cart. The upper panel of the windshield is moveable from a closed position wherein air flow is shielded from the face of the driver, to an open position wherein air flows freely above the lower panel and through the support posts to the driver while the cart is in motion. When in the open position, the upper panel pivots outwardly from the normal plane of the windshield and overlies the lower panel. A first attachment device holds the upper panel in the closed, air-shielding position, and a second attachment device holds the upper panel in the open, air-flowing position.

A split windshield assembly, as described generally above, is known in the art. Many of these windshield assemblies, however, include attachment devices which are inadequate for effectively holding the upper panel of the split windshield in the open and closed positions while the cart is in motion. According to one prior art windshield assembly, each of the first and second attachment devices have a pair of relatively thin arms for engaging either the front support posts or a curved top edge of the upper panel. The attachment devices are constructed of a hard resinous material, and require frequent replacement due to breakage and cracking of the arms. In addition, because the attachment devices are relatively hard or rigid, they do not effectively grip and hold the upper panel in the desired position while the golf cart is in motion.

A windshield assembly of the present invention over comes the drawbacks of the prior art by providing respective first and second flexible attachment devices which resist breakage and cracking. The devices securely hold the upper panel in both the open and closed positions, and do not require frequently replacement due to wear and damage.

SUMMARY OF THE INVENTION

Therefore, it is an object of the invention to provide a windshield assembly which includes flexible and durable attachment devices for holding the upper windshield panel in both the open and closed positions.

It is another object of the invention to provide a windshield assembly which includes a pair of hollow clamps and a pair of retainer clips for holding the upper windshield panel in the open and closed position, respectively.

It is another object of the invention to provide a retainer clip which is permanently attached to an upper portion of the front support post, and which includes a flexible windshield retaining member for securely holding the upper windshield panel in the closed position.

It is another object of the invention to provide a retainer clip which includes a flexible windshield retaining member which is pivotable from a biased, panel holding position to a flexed, panel release position.

It is another object of the invention to provide a retainer clip which is made from a flexible, resinous material such as neoprene rubber.

It is another object of the invention to provide a retainer clip which includes an ultraviolet inhibitor for resisting damage and wear caused by the sun.

It is another object of the invention to provide a hollow clamp for being attached to a lower portion of the lower windshield panel, and which includes a longitudinal groove for holding a curved top edge of the upper windshield panel when the upper windshield panel is in the open position.

It is another object of the invention to provide a hollow clamp which is durable, and which provides sufficient holding strength for holding the upper windshield panel in the open position while the golf cart is in motion.

It is another object of the invention to provide a hollow clamp which is made from a flexible, resinous material such as neoprene rubber.

It is another object of the invention to provide a hollow clamp which includes an ultraviolet inhibitor for protecting the clamp from wear and damage caused by the sun.

These and other objects of the present invention are achieved in the preferred embodiments disclosed below by providing a windshield assembly of the type for attachment to a pair of laterally spaced and vertically extending front support posts of a recreation vehicle. The windshield assembly includes a lower windshield panel for being permanently attached to a lower portion of respective front support posts and an upper windshield panel pivotally connected along a top side edge of the lower windshield panel. The upper windshield panel is movable from a closed position generally coplaner with the lower windshield panel to an open position generally forward of and beside the lower windshield panel. The upper windshield panel includes an outwardly curved side edge for engaging a clamp located at the base of the lower windshield panel when the upper windshield panel is in the open position.

The improvement in the windshield assembly includes a retainer clip constructed of a flexible material. The clip is for being attached to an upper portion of a least one of the front support posts for releasably holding the upper windshield panel in the closed position. The clip includes an attachment member having an outer surface for engaging and being attached to a front portion of the front support posts, and an inner surface for engaging an inside face of the upper windshield panel when the upper windshield panel is in the closed position.

A windshield retaining member is integrally formed at one end with the attachment member. The windshield retaining member has an inner surface opposite the inner surface of the attachment member for engaging an obverse face of the upper windshield panel when the upper windshield panel is in the closed position. The attachment member and the windshield retaining member cooperate to securely hold the upper windshield panel therebetween in the closed position while the recreation vehicle is in motion. The windshield retaining member is movable from a biased, panel holding position adjacent the obverse face of the upper windshield panel to a panel release position generally perpendicular to the obverse face of the upper windshield panel.

According to another preferred embodiment of the invention, the attachment member includes an extension for engaging an inner side portion of the front support posts. The extension is integrally formed at one end with the attachment member, and extends substantially perpendicular to the attachment member.

According to yet another preferred embodiment of the invention, the retainer clip is connected to the front support posts by a screw for being inserted through the extension of the attachment member and into the inner side portion of the front support posts.

According to yet another preferred embodiment of the invention, the retainer clip further includes at least one thumb grip located on an outer surface of the windshield retaining member for receiving pressure applied by the thumb or forefinger of the user to flex the windshield retaining member from the biased, panel holding position outwardly to the panel release position.

According to yet another preferred embodiment of the invention, the retainer clip includes first and second spaced apart thumb grips integrally formed with an outer surface of the windshield retaining member for receiving pressure applied by the thumb or forefinger of the user to flex the windshield retaining member from the biased, panel holding position outwardly to the panel release position. The first thumb grip is located generally at a distal end of the windshield retaining member, and the second thumb grip is located generally at a proximal end of the windshield retaining member.

Preferably, the retainer clip is constructed of a flexible synthetic resin material.

Preferably, the retainer clip includes an ultraviolet inhibitor to protect the retainer clip from damage and wear caused by the sun.

According to another preferred embodiment of the invention, the windshield assembly further includes flexible, hollow clamp having a base, and first and second hollow arms. The base is fixedly attached to the lower windshield panel at a lower portion thereof. The first and second flexible hollow arms are integrally formed with the base, and extend outwardly from the base. The first and second hollow arms have opposed, closely spaced-apart inside surfaces. The inside surfaces define a longitudinally-extending, windshield-holding channel for engaging the curved top edge of the upper windshield panel when the upper windshield panel is in the open position.

According to yet another preferred embodiment of the invention, each one of the first and second hollow arms includes a rib support integrally formed with opposing inner walls thereof. The rib support extends in a plane parallel to and spaced-apart from the base of the clamp.

According to yet another preferred embodiment of the invention, the clamp further includes at least one windshield grip integrally formed with respective inside surfaces of the first and second arms to further secure the curved top edge of the upper windshield panel between the first and second arms when the upper windshield panel is in the open position.

Preferably, the clamp is constructed of a flexible synthetic resin material, and includes an ultraviolet inhibitor to protect the clamp from damage and wear caused by the sun.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
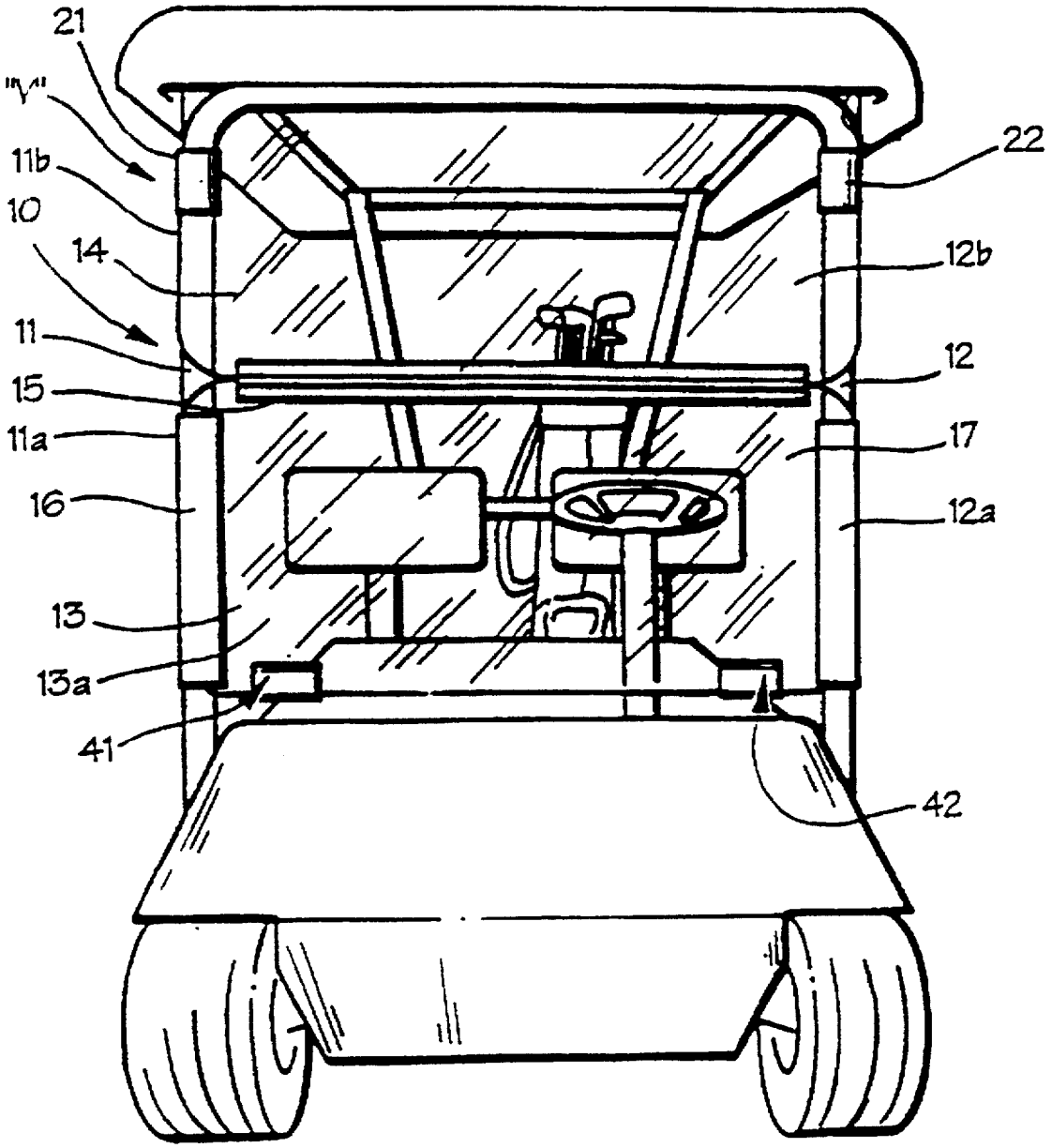
FIG. 1 is a front perspective view of a recreation vehicle having a windshield assembly according to the present invention attached thereto.

Referring now specifically to the drawings, a windshield assembly according to the present invention is illustrated in FIG. 1 and shown generally at reference numeral 10. The windshield assembly 10 is designed particularly for attachment to a pair of laterally spaced and vertically extending front support posts 11 and 12 of a recreation vehicle "V", such as a golf cart.

The windshield assembly 10 includes a lower windshield panel 13 and an upper windshield panel 14. Preferably, the panels 13 and 14 are made of either clear or tint, extruded methyl methacrylate or acrylic, and are approximately 4.5 mm thick. The lower windshield panel 13 is permanently attached to respective lower portions 11a and 12a of the front support posts 11 and 12 by a pair of elongate post fixtures 16 and 17. The post fixtures 16 and 17 are well known in the art, and are typically constructed of a polyvinyl chloride material. Preferably, the upper windshield panel 14 is connected to the lower windshield panel 13 by a laterally extending hinge 15. The hinge 15 allows movement of the upper windshield panel 14 from a closed position (See FIGS. 1 and 2), generally coplaner with the lower windshield panel 13, to an open position forward of and beside the lower windshield panel 13 (See FIG. 3). The hinge 15 is preferably constructed of a urethane elastomer center section, and side body parts formed of a high-impact acrylic. The hinge 15 may be that manufactured by Westedge, Inc. under the trademark "Flex-Fold."

Retainer Clip

Figure 2:
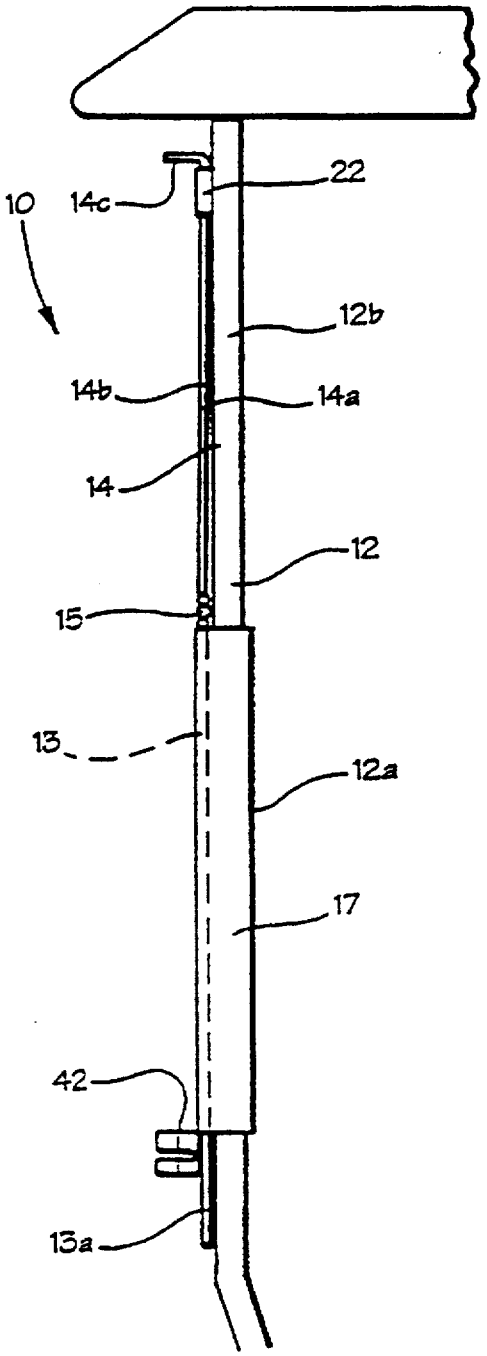
FIG. 2 is a fragmentary side elevation of a front portion of the recreation vehicle illustrated in FIG. 1 showing the windshield assembly in a closed position.

When in the closed position as shown in FIGS. 1 and 2, the upper windshield panel 14 is held adjacent to respective upper portions 11b and 12b of the front support posts 11 and 12 by one or more retainer clips 21 and 22. Preferably, a single retainer clip 21,22 is located on each of the respective front support posts 11 and 12. The retainer clips 21 and 22 are constructed of a flexible synthetic resin material, such as neoprene (rubber), urethane, EDPM, or vinyl. Preferably, the retainer clips 21 and 22 are constructed of a synthetic material manufactured by BF Goodrich under the trademark "Estane."

The retainer clips 21 and 22 are formed by extruding the resin material through a die to produce a length of material, and then cutting the length at predetermined intervals. For achieving sufficient holding strength, the retainer clips 21 and 22 are cut approximately 4–8 cm in length. In addition, an ultraviolet inhibitor may be incorporated in the resin material to protect the retainer clips 21 and 22 from sun damage and wear.

The retainer clip 22 for attachment to support post 12 is described in detail below with reference to FIGS. 4–8. The components and features of the retainer clip 22 and support post 12 are identical to that of retainer clip 21 and support post 11, respectively. Thus, any description of retainer clip 22 applies equally to retainer clip 21, and clip 21 will not be further described.

Figure 4:
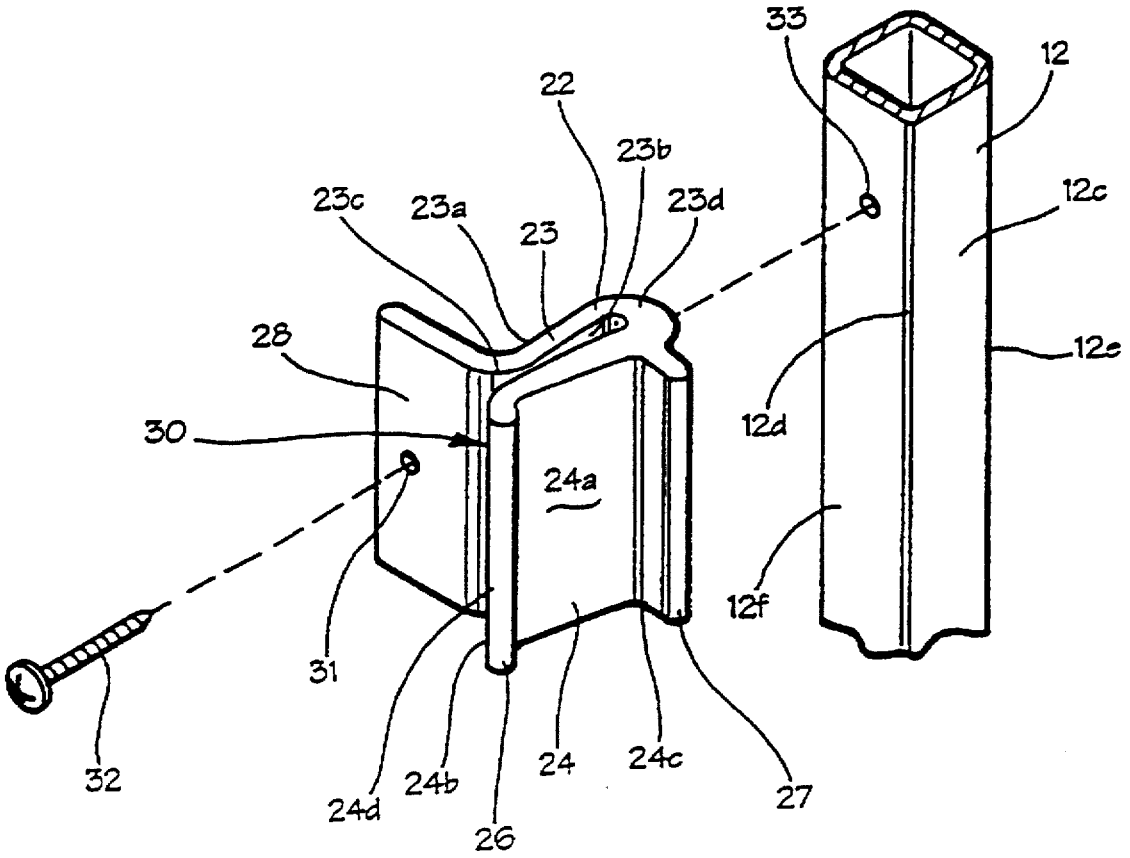
FIG. 4 is a perspective view of a retainer clip according to the present invention showing particularly the means for attaching the clip to a portion of the front support post of the recreation vehicle.
Figure 5:
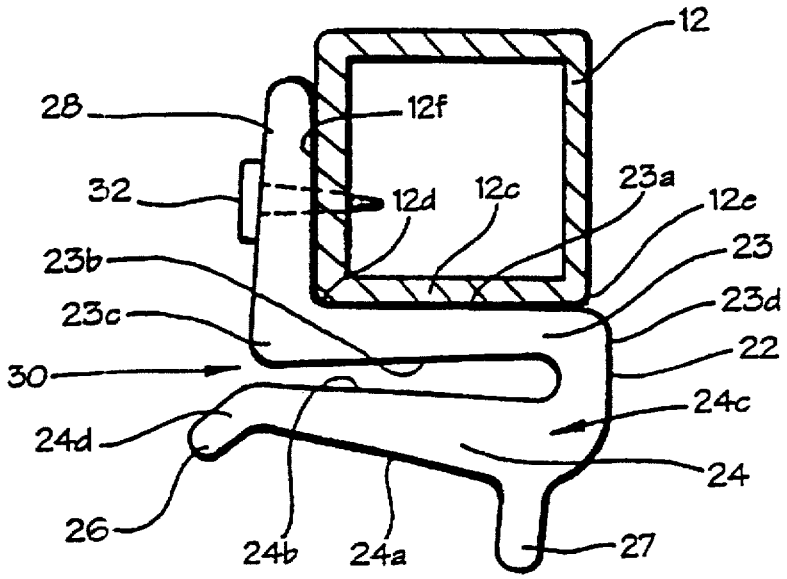
FIG. 5 is a top plan view of the retainer clip as attached to the front support post (shown in cross-section) of the recreation vehicle, showing the clip in the panel holding position.
Figure 6:
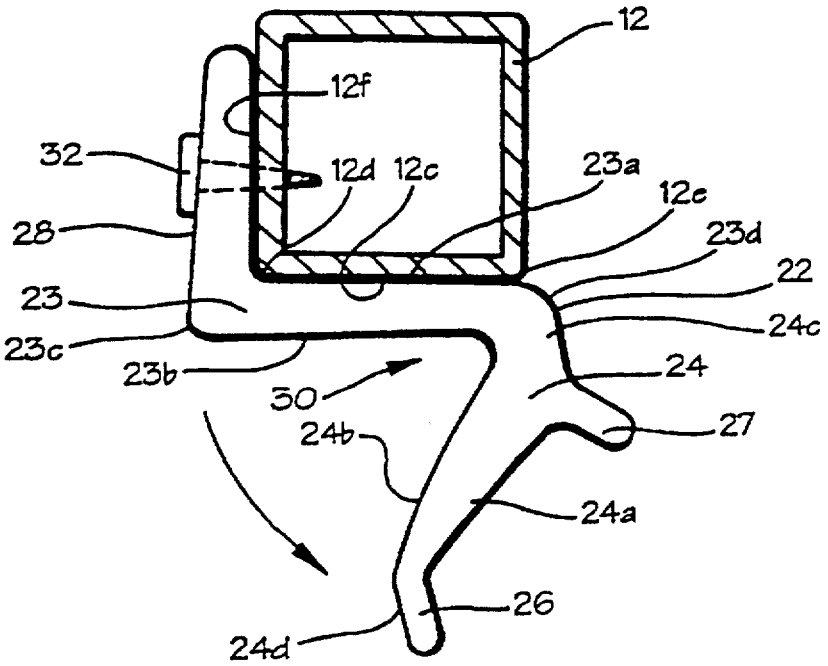
FIG. 6 is a top plan view of the retainer clip as attached to the front support post (shown in cross-section) of the recreation vehicle, showing the clip in the panel release position.

Referring now to FIGS. 4–8, retainer clip 22 includes an attachment member 23 and a windshield retaining member 24. The attachment member 23 has an outer surface 23a for engaging and being attached to a front portion 12c of the front support post 12, and an inner surface 23b for engaging an inside face 14a of the upper windshield panel 14 when the upper windshield panel 14 is in the closed position (See FIGS. 7 and 8). As best shown in FIGS. 5 and 6, when attached to the front support post 12, a first side end 23c of the attachment member 23 is located generally at an inside edge 12d of the support post 12, and a second side end 23d of the attachment member 23 is located just beyond an outside edge 12e of the support post 12. According to one preferred embodiment, the attachment member 23 is approximately 3–4 cm wide, and 0.5 cm thick.

Preferably, the attachment member 23 further includes an extension 28 for engaging an inner side portion 12f of the front support post 12. The extension 28 is integrally formed with the first side end 23c of the attachment member 23, and extends approximately 2–3 cm in width substantially perpendicular to the plane of the attachment member 23. As best shown in FIG. 4, the extension 28 may include a small pilot hole 31 for receiving a metal screw 32, such as a #6 interior trim screw. The metal screw 32 passes through the extension 28 and front support post 12 to permanently attach the retainer clip 22 to the support post 12. Additionally, the support post 12 may have a corresponding pilot hole 33 formed therein to guide the screw 32 into the support post 12. According to a second embodiment, the retainer clip 22 may be attached to the front support post 12 by any suitable rubber adhesive. According to a third embodiment, the clip 22 may be formed with a clip fastener (not shown) having spaced-apart, slightly resilient arms for frictionally engaging the support post 12, and thus attaching the clip 22 to the post 12.

Figure 7:
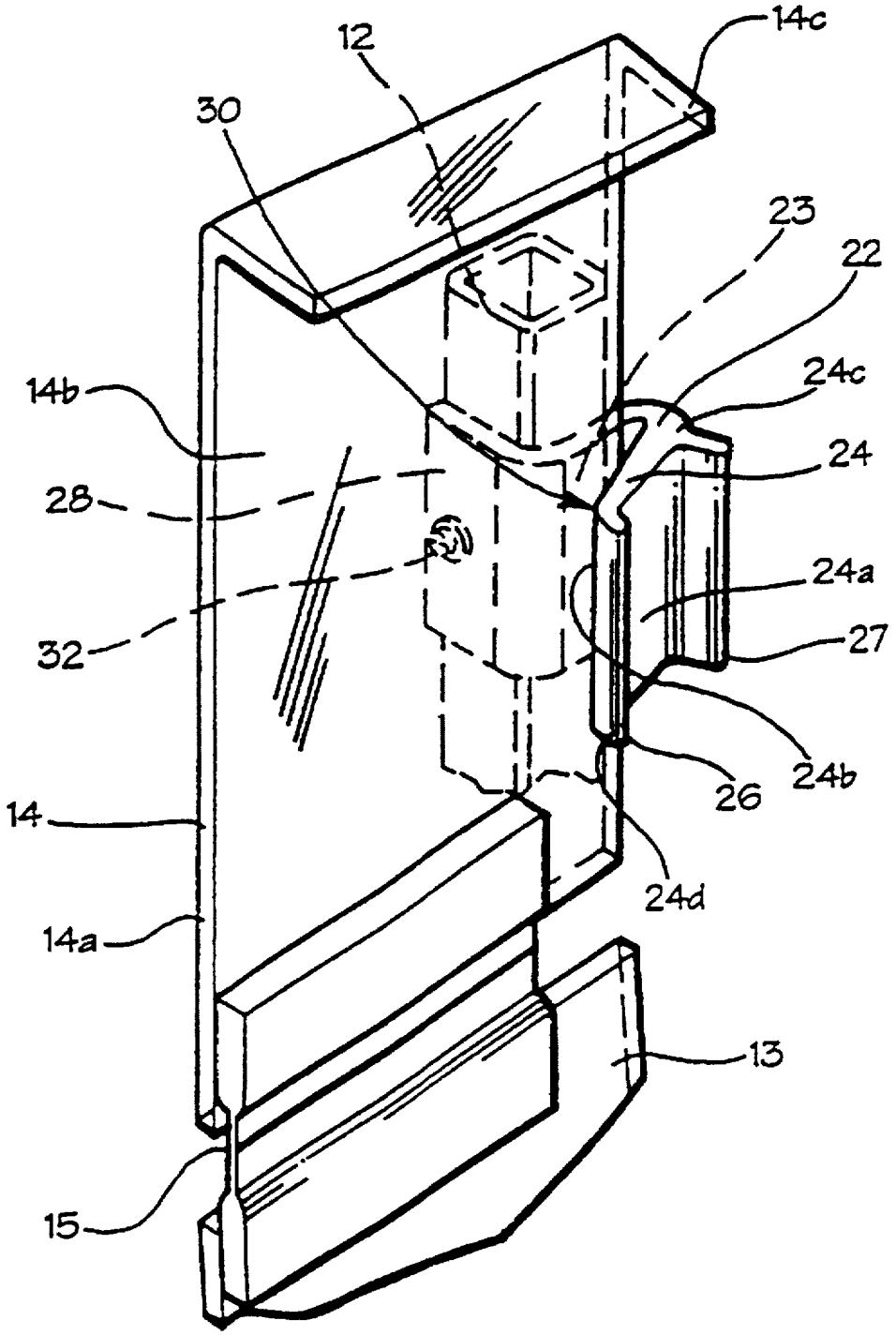
FIG. 7 is a fragmentary perspective view of a portion of the windshield assembly, illustrating the retainer clip in a biased condition holding the upper windshield panel in the closed position.
Figure 8:
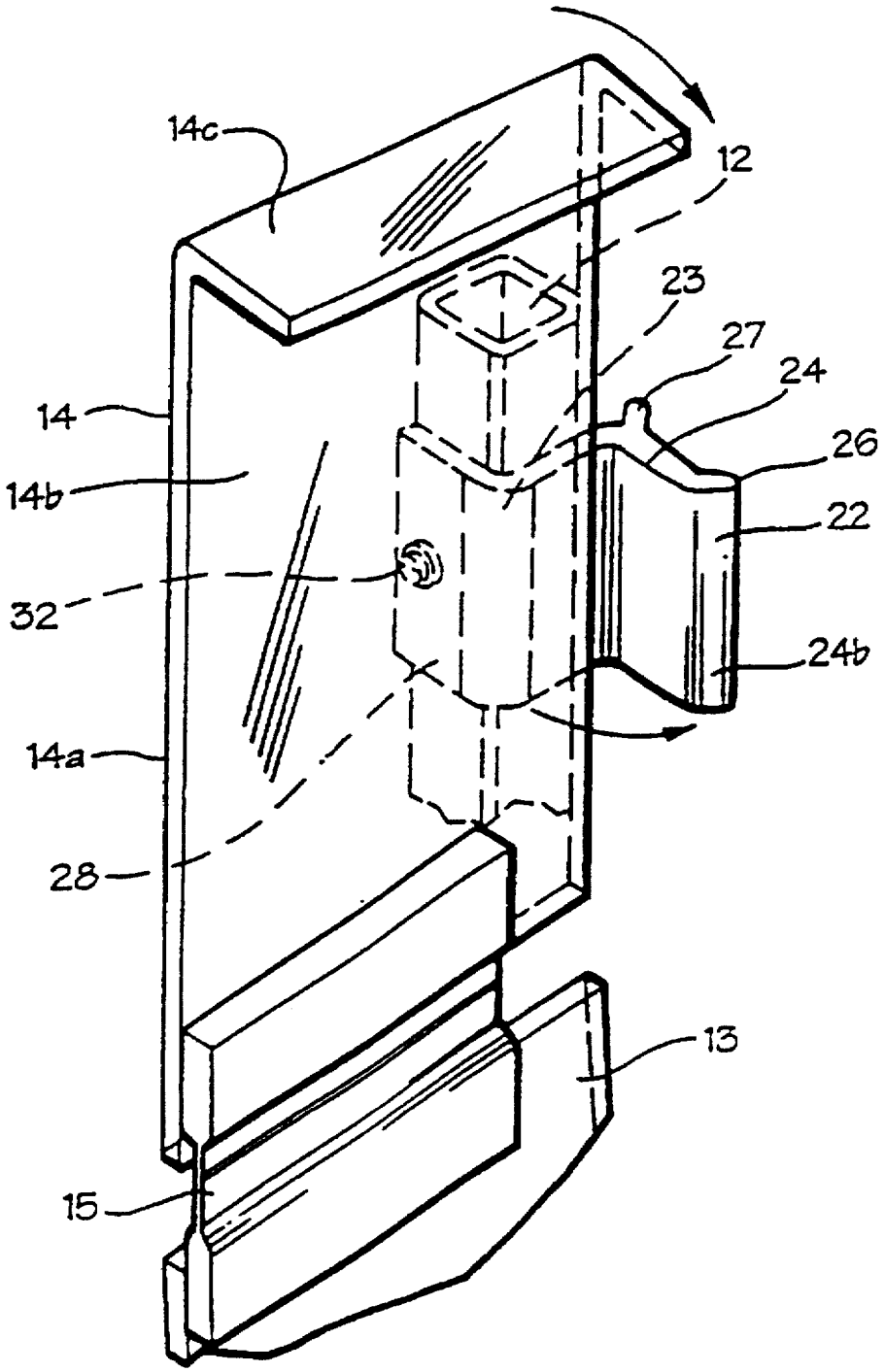
FIG. 8 is a fragmentary perspective view of a portion of the windshield assembly, illustrating the retainer clip in a flexed condition for allowing the upper windshield panel to pivot from the closed to the open position.

The flexible windshield retaining member 24 of the retainer clip 22 has an inner surface 24b opposite the inner surface 23b of the attachment member 23 for engaging an obverse face 14b of the upper windshield panel 14 when the upper windshield panel 14 is in the closed position (See FIGS. 7 and 8). The windshield retaining member 24 is integrally formed with the second side end 23d of the attachment member 23, and normally overlaps the attachment member 23 in a biased condition. When biased or nonflexed, the windshield retaining member 24 resides in slightly spaced, overlying relation to the attachment member 23, thereby defining a slot 30 between the attachment member 23 and the windshield retaining member 24. The width of the windshield retaining member 24 is approximately 3–4 cm, and preferably corresponds to the width of the attachment member 23.

As best shown in FIG. 7, the attachment member 23 and the windshield retaining member 24 of the retainer clip 22 cooperate to securely hold the upper windshield panel 14 in the closed position within the slot 30 while the golf cart is in motion. FIGS. 5 and 7 illustrate the windshield retaining member 24 in a normal, biased position. To release the upper windshield panel 14 from the slot 30, the windshield retaining member 24 is flexed from the biased position to a panel release position generally perpendicular to the plane of the upper windshield panel 14. FIGS. 6 and 8 illustrate the windshield retaining member 24 in a flexed, panel release position, permitting movement of the upper windshield panel 14 from the closed position to the open position. To provide a sufficient biasing force, the windshield retaining member 24 is preferably about 0.8 cm thick at its proximal end 24c, and about 0.5 cm thick at its distal end 24d.

First and second hand grips 26 and 27 are preferably formed on an outer surface 24a of the windshield retaining member 24 to receive pressure applied by the thumb or forefinger of the user. The hand grips 26 and 27 allow the user to easily flex the windshield retaining member 24 from the biased position outwardly to the panel release position. According to one preferred embodiment, the hand grips 26 and 27 protrude outwardly approximately 0.5 cm from the plane of the windshield retaining member 24. The first hand grip 26 is located generally at the distal end 24d of the windshield retaining member 24, and the second hand grip 27 is located generally at a proximal end 24c of the windshield retaining member 24.

Windshield Clamp

Figure 3:
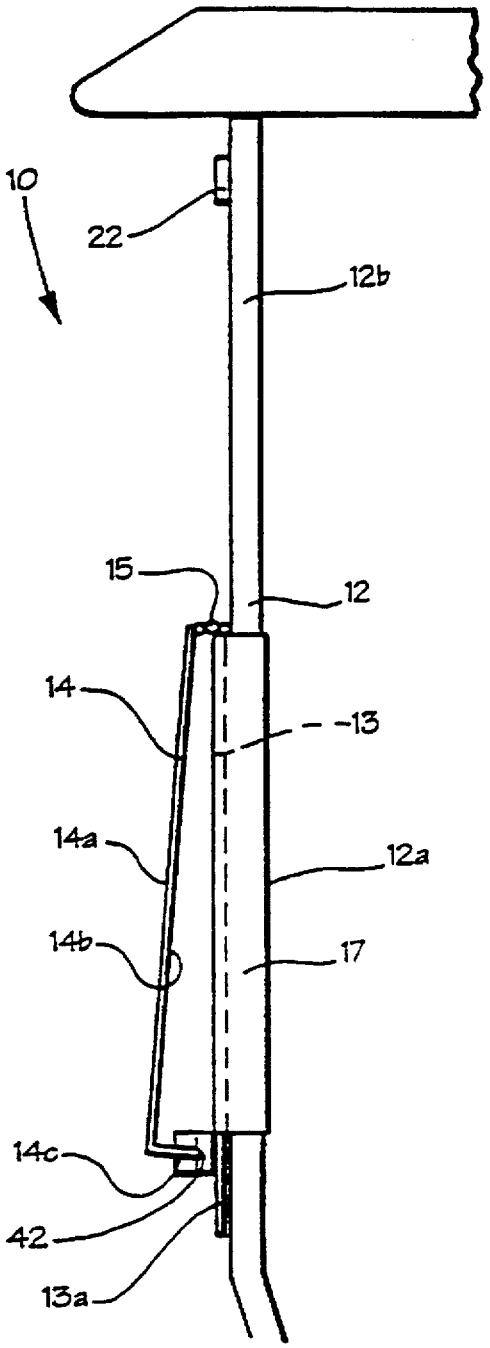
FIG. 3 is a fragmentary side elevation of a front portion of the recreation vehicle illustrated in FIG. 1 showing the windshield assembly in an open position.

Referring now to FIGS. 1–3 and 9–10, the windshield assembly may further include at least one flexible, hollow clamp 41 located at the base of the lower windshield panel 13 (See FIGS. 1–3). Preferably, the windshield assembly includes two identical clamps 41 and 42. The clamps 41,42 serve to grip an outwardly curved top edge 14c of the upper windshield panel 14 to thereby hold the panel 14 in the open position while the golf cart "V" is in motion. Preferably, the clamps 41 and 42 are constructed of a flexible synthetic resin material, such as neoprene rubber, and include an ultraviolet inhibitor to protect the clamps 41,42 from sun damage and wear. According to a preferred embodiment, the clamps 41,42 are approximately 6–7 cm long and 2–3 cm wide, respectively.

The clamps 41 and 42 are described in detail below with reference to clamp 42. Since clamp 41 is identical to clamp 42, it will not be further described.

Figure 9:
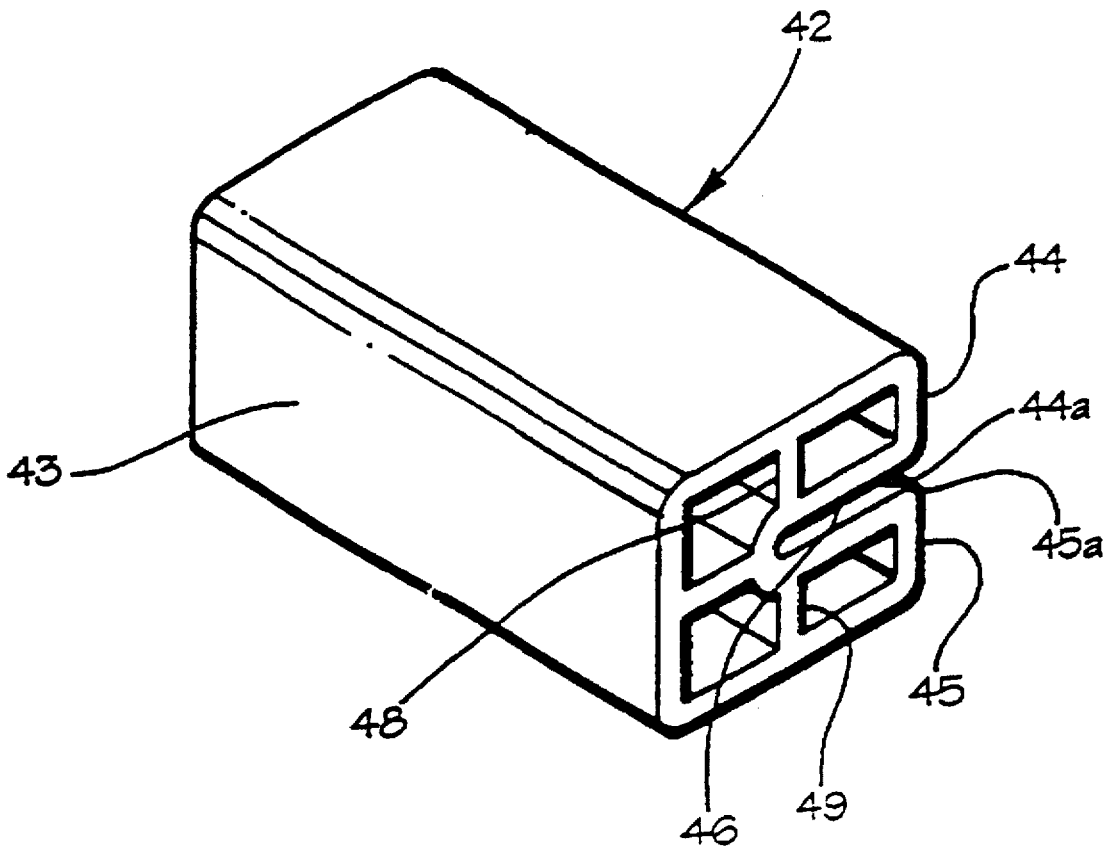
FIG. 9 is a perspective view of a hollow clamp for gripping a curved top edge of the upper windshield panel to hold the upper windshield panel in the open position.
Figure 10:
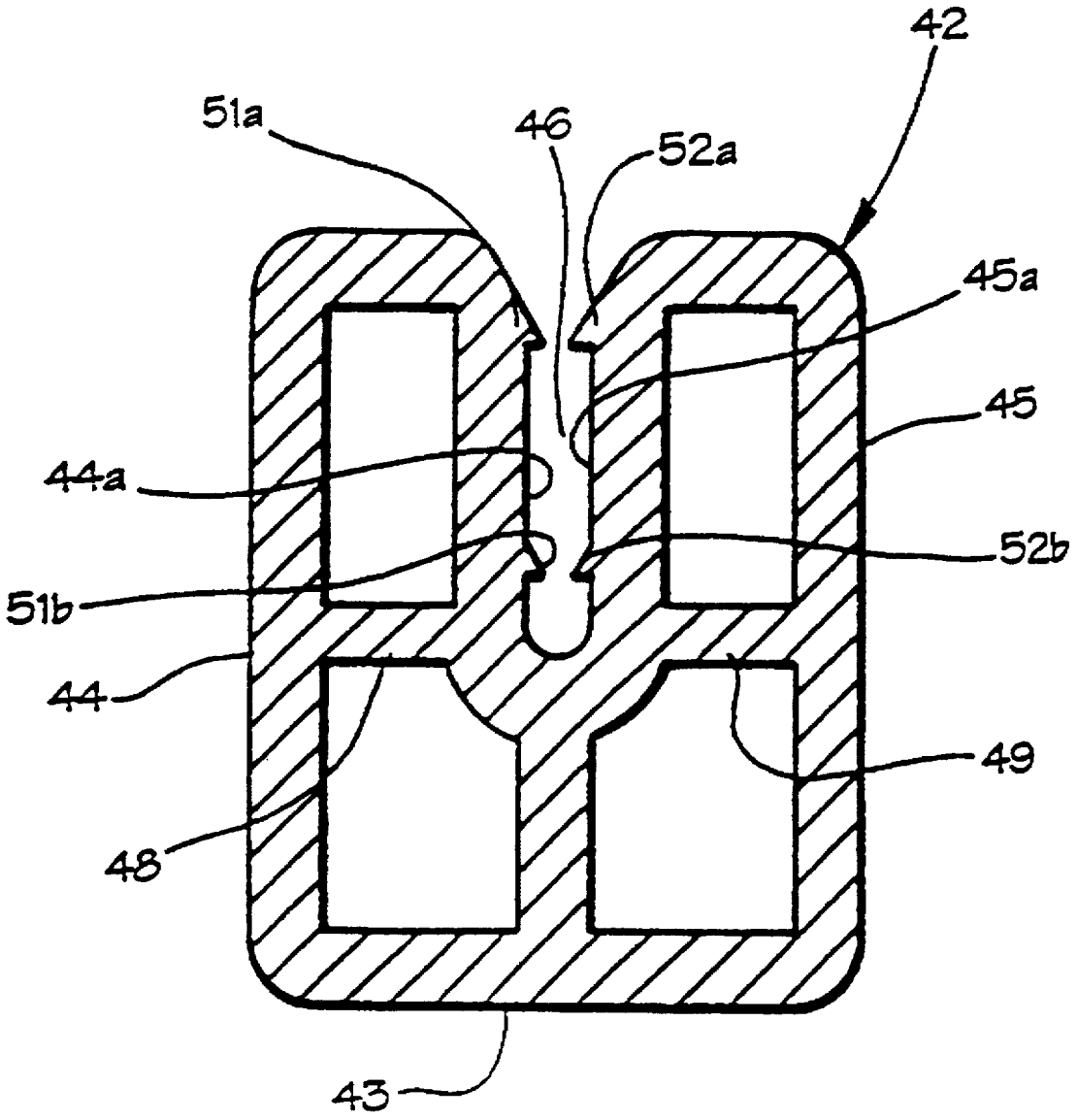
FIG. 10 is a cross-sectional end view of the hollow clamp according to that shown in FIG. 9.

As best shown in FIGS. 9 and 10, the clamp 42 includes a base 43, and first and second flexible hollow arms 44 and 45. The base 43 is attached to the lower windshield panel 13 at a lower portion 13a of the panel 13 (See FIGS. 1–3) by a suitable rubber adhesive. Preferably, the base 43 is approximately 0.3–0.5 cm thick. The first and second hollow arms 44 and 45 are integrally formed with the base 43, and extend outwardly approximately 3–4 cm from the base 43. The arms 44 and 45 have opposed, closely spaced-apart inside surfaces 44a and 45a which define a longitudinally-extending, windshield-holding channel 46. According to a preferred embodiment, the inside surfaces 44a and 45a of the respective flexible arms 44 and 45 are spaced-apart approximately 0.3 cm. The windshield holding channel 46, defined by the spaced-apart inside surfaces 44a and 45a, engages and holds the curved top edge 14c of upper windshield panel 14 when the upper windshield panel 14 is in the open position (See FIG. 3).

The first and second hollow arms 44 and 45 preferably include respective rib supports 48 and 49 integrally formed with the opposing inner walls of the hollow arms 44 and 45. The rib supports 48 and 49 supply added holding strength to clamp 42, and extend in a plane parallel to and spaced-apart from the base 43. Additionally, to further increase its holding strength, the clamp 42 may include windshield grips 51a, b and 52a, b (See FIG. 10) integrally formed with respective inside surfaces 44a and 45a of the first and second arms 44 and 45. The grips 51a, b and 52a, b act to further secure the curved top edge 14c of the upper windshield panel 14 between the first and second arms 44 and 45 when the upper windshield panel 14 is in the open position.

An improved windshield assembly is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. In a split windshield assembly of the type for attachment to a pair of laterally spaced and vertically extending front support posts of a recreation vehicle, and including a lower windshield panel for being permanently attached to a lower portion of respective front support posts and an upper windshield panel pivotally connected along a top side edge of the lower windshield panel, the upper windshield panel being movable from a closed position generally coplaner with the lower windshield panel to an open position generally forward of and beside the lower windshield panel, and the upper windshield panel including an outwardly curved top side edge for engaging a holding means located at the base of the lower windshield panel when the upper windshield panel is in the open position; the improvement in said windshield assembly comprising a retainer clip constructed of a flexible material for being attached to an upper portion of a least one of said front support posts for releasably holding said upper windshield panel in the closed position, said retainer clip comprising:

(a) an attachment member having an outer surface for engaging and being attached to a front portion of said front support posts, and an inner surface for engaging an inside face of said upper windshield panel when said upper windshield panel is in the closed position;

(b) a windshield retaining member integrally formed at one end with said attachment member and having an inner surface opposite the inner surface of said attachment member for engaging an obverse face of the upper windshield panel when said upper windshield panel is in the closed position, whereby the attachment member and the windshield retaining member cooperate to securely hold said upper windshield panel therebetween in the closed position while the recreation vehicle is in motion; and (c) said windshield retaining member being movable from a biased, panel holding position adjacent the obverse face of the upper windshield panel to a panel release position generally perpendicular to the obverse face of the upper windshield panel.

2. An improved windshield assembly according to claim 1, wherein said attachment member includes an extension for engaging an inner side portion of said front support post, said extension being integrally formed at one end with said attachment member and extending substantially perpendicular to said attachment member.

3. An improved windshield assembly according to claim 2, wherein said retainer clip is connected to said front support posts by a screw for being inserted through the extension of said attachment member and into the inner side portion of said front support posts.

4. An improved windshield assembly according to claim 3, wherein said retainer clip further includes at least one hand grip located on an outer surface of the windshield retaining member for receiving pressure applied by the thumb or forefinger of the user to flex said windshield retaining member from the biased, panel holding position outwardly to the panel release position.

5. An improved windshield assembly according to claim 3, wherein said retainer clip includes first and second spaced apart hand grips integrally formed with an outer surface of said windshield retaining member for receiving pressure applied by the thumb or forefinger of the user to flex said windshield retaining member from the biased, panel holding position outwardly to the panel release position, said first hand grip located generally at a distal end of said windshield retaining member and said second hand grip located generally at a proximal end of said windshield retaining member.

6. An improved windshield assembly according to claim 1 or 4, wherein said retainer clip is constructed of a flexible synthetic resin material.

7. An improved windshield assembly according to claim 1, wherein said retainer clip includes an ultraviolet inhibitor to protect said retainer clip from damage and wear caused by the sun.

8. A retainer clip for holding an upper windshield panel of a split windshield assembly in a closed position adjacent to first and second front support posts of a recreation vehicle, said retainer clip comprising:

(a) an attachment member having an outer surface for engaging and being attached to a front portion of said front support posts, and an inner surface for engaging an inside face of said upper windshield panel when said upper windshield panel is in the closed position;

(b) a windshield retaining member integrally formed at one end with said attachment member and having an inner surface opposite the inner surface of said attachment member for engaging an obverse face of the upper windshield panel when said upper windshield panel is in the closed position, whereby the attachment member and the windshield retaining member cooperate to securely hold said upper windshield panel therebetween in the closed position while the recreation vehicle is in motion; and (c) said windshield retaining member being movable from a biased, panel holding position adjacent the obverse face of the upper windshield panel to a panel release position generally perpendicular to the obverse face of the upper windshield panel.

9. A retainer clip according to claim 8, wherein said attachment member includes an extension for engaging an inner side portion of said front support post, said extension being integrally formed at one end with said attachment member and extending substantially perpendicular to said attachment member.

10. A retainer clip according to claim 9, wherein said retainer clip is connected to said front support posts by a screw for being inserted through the extension of said attachment member and into the inner side portion of said front support posts.

11. In a split windshield assembly of the type for attachment to a pair of laterally spaced and vertically extending front support posts of a recreation vehicle, and including a lower windshield panel for being permanently attached to a lower portion of respective front support posts and an upper windshield panel pivotally connected along a top side edge of the lower windshield panel, the upper windshield panel being movable from a closed position generally coplaner with the lower windshield panel to an open position generally forward of and beside the lower windshield panel, the upper windshield panel including an outwardly curved top side edge for engaging a holding means located at the base of the lower windshield panel when the upper windshield panel is in the open position; the improvement in said windshield assembly comprising a flexible, hollow windshield clamp attached to the lower windshield panel at a lower portion thereof for holding said upper windshield panel in the open position generally forward of and beside the lower windshield panel, said clamp comprising:

(a) a base for being fixedly attached to the lower windshield panel at a lower portion thereof; and (b) first and second flexible hollow arms integrally formed with the base and extending outwardly from the base, said first and second hollow arms having opposed, closely spaced-apart inside surfaces defining a longitudinally-extending, windshield-holding channel for engaging the curved top edge of said upper windshield panel when said upper windshield panel is in the open position.

12. An improved windshield assembly according to claim 11, wherein each one of said first sad second hollow arms includes a rib support integrally formed with opposing inner walls thereof, said rib support extending in a plane parallel to and spaced-apart from the base of the clamp.

13. An improved windshield assembly according to claim 12, wherein said clamp further includes at least one windshield grip integrally formed with respective inside surfaces of said first and second arms to further secure the curved top edge of said upper windshield panel between the first and second arms when the upper windshield panel is in the open position.

14. An improved windshield assembly according to claim 13, wherein said clamp is constructed of a flexible synthetic resin material.

15. An improved windshield assembly according to claim 14, wherein said clamp includes an ultraviolet inhibitor to protect said clamp from damage and wear caused by the sun.

16. A hollow windshield clamp for being attached to a lower windshield panel of a split windshield assembly to grip and hold a curved top edge of an upper windshield panel when said upper windshield panel is in an open position, said clamp comprising:

(a) a base for being fixedly attached to the lower windshield panel at a lower portion thereof; and (b) first and second flexible hollow arms integrally formed with the base and extending outwardly from the base, said first and second hollow arms having opposed, closely spaced-apart inside surfaces defining a longitudinally-extending, windshield-holding channel for engaging the curved top edge of said upper windshield panel when said upper windshield panel is in the open position.

17. A hollow windshield clamp according to claim 16, wherein each one of said first and second hollow arms includes a rib support integrally formed with opposing inner walls thereof, said rib support extending in a plane parallel to and spaced-apart from the base of the clamp.

18. A hollow windshield clamp according to claim 17, wherein said clamp further includes at least one windshield grip integrally formed with respective inside surfaces of said first and second arms to further secure the curved top edge of said upper windshield panel between the first and second arms when the upper windshield panel is in the open position.

19. In a split windshield assembly of the type for attachment to a pair of laterally spaced and vertically extending front support posts of a recreation vehicle, and including a lower windshield panel for being permanently attached to a lower portion of respective front support posts and an upper windshield panel pivotally connected along a top side edge of the lower windshield panel, the upper windshield panel being movable from a closed position generally coplaner with the lower windshield panel to an open position generally forward of and beside the lower windshield panel, the upper windshield panel including an outwardly curved top edge for engaging a holding means located at the base of the lower windshield panel when the upper windshield panel is in the open position; the improvement in said windshield assembly comprising:

(a) a retainer clip constructed of a flexible material for being attached to an upper portion of a least one of said front support posts for releasably holding said upper windshield panel in the closed position, said retainer clip comprising:

(1) an attachment member having an outer surface for engaging and being attached to a front portion of said front support posts, and an inner surface for engaging an inside face of said upper windshield panel when said upper windshield panel is in the closed position;

(2) a windshield retaining member integrally formed with said attachment member and having an inner surface opposite the inner surface of said attachment member for engaging an obverse face of the upper windshield panel when said upper windshield panel is in the closed position, whereby said attachment member and windshield retaining member cooperate to securely hold said upper windshield panel therebetween in the closed position while said recreation vehicle is in motion; and (3) said windshield retaining member being movable from a biased, panel holding position adjacent the obverse face of the upper windshield panel to a panel release position generally perpendicular to the obverse face of the upper windshield panel (b) a flexible, hollow windshield clamp attached to the lower windshield panel at a lower portion thereof for holding said upper windshield panel in the open position generally forward of and beside the lower windshield panel, said clamp comprising:

(1) a base for being fixedly attached to the lower windshield panel at a lower portion thereof; and (2) first and second flexible hollow arms integrally formed with the base and extending outwardly from the base, said first and second hollow arms having opposed, closely spaced-apart inside surfaces defining a longitudinally-extending, windshield-holding channel for engaging the curved top side edge of said upper windshield panel when said upper windshield panel is in the open position.

*20. In a split-panel windshield assembly of the type for attachment to at least one of a pair of laterally spaced and vertically extending front support posts of a recreation vehicle, and including a lower windshield panel for being attached to a lower portion of respective front support posts and an upper windshield panel pivotally connected along a top side edge of the lower windshield panel, the upper windshield panel being movable from a closed position generally above and coplanar with the lower windshield panel to an open position generally forward of and beside the lower windshield panel; the improvement in said windshield assembly comprising a flexible, resilient windshield retainer clip for releasably retaining the upper windshield panel in its closed position, said retainer clip including a retaining member flexible to the extent of at least 90 degrees so as to be manually flexed*

*(a) from a biased, panel retaining condition for holding the upper windshield panel in its closed position adjacent to the front support posts; and*

*(b) into a flexed condition for releasing the upper windshield panel into its open position and for moving the upper windshield panel into its closed position;*

*(c) said retaining member having at least one hand grip formed therewith for receiving pressure applied by a user's thumb or forefinger to facilitate movement of said retaining member from the panel retaining condition to the flexed condition.*

*21. In a split-panel windshield assembly of the type for attachment to at least one of a pair of laterally spaced and vertically extending front support posts of a recreation vehicle, and including a lower windshield panel for being attached to a lower portion of respective front support posts and an upper windshield panel pivotally connected along a top side edge of the lower windshield panel, the upper windshield panel being movable from a closed position generally above and coplanar with the lower windshield panel to an open position generally forward of and beside the lower windshield panel; the improvement in said windshield assembly comprising a flexible, resilient windshield retainer clip for releasably retaining the upper windshield panel in its closed position, said retainer clip including a retaining member and having an integrally-formed flexible hinge to permit said retaining member to be manually flexed*

*(a) from a biased, panel retaining condition for holding the upper windshield panel in its closed position adjacent to the front support posts; and*

*(b) into a flexed condition for releasing the upper windshield panel into its open position and for moving the upper windshield panel into its closed position*

*(c) said retaining member having at least one hand grip formed therewith for receiving pressure applied by a user's thumb or forefinger to facilitate movement of said retaining member from the panel retaining condition to the flexed condition.*

*22. In a split-panel windshield assembly of the type for attachment to at least one of a pair of laterally spaced and vertically extending front support posts of a recreation vehicle, and including a lower windshield panel for being attached to a lower portion of respective front support posts and an upper windshield panel pivotally connected along a top side edge of the lower windshield panel, the upper windshield panel being movable from a closed position generally above and coplanar with the lower windshield panel to an open position generally forward of and beside the lower windshield panel; the improvement in said windshield assembly comprising a flexible, resilient windshield retainer clip for releasably retaining the upper windshield panel in its closed position, said retainer clip including a retaining member sufficiently flexible so as to be manually flexed*

*(a) from a biased, panel retaining condition for holding the upper windshield panel in its closed position adjacent to the front support posts; and*

*(b) into a flexed condition for releasing the upper windshield panel into its open position and for moving the upper windshield panel into its closed position*

*(c) said retaining member having at least one hand grip formed therewith for receiving pressure applied by a user's thumb or forefinger to facilitate movement of said retaining member from the panel retaining condition to the flexed condition.*

*23. In a split-panel windshield assembly of the type for attachment to at least one of a pair of laterally spaced and vertically extending front support posts of a recreation vehicle, and including a lower windshield panel for being attached to a lower portion of respective front support posts and an upper windshield panel pivotally connected along a top side edge of the lower windshield panel, the upper windshield panel being movable from a closed position generally above and coplanar with the lower windshield panel to an open position generally forward of and beside the lower windshield panel; the improvement in said windshield assembly comprising a flexible, resilient windshield retainer clip formed of rubber for releasably retaining the upper windshield panel in its closed position, said retainer clip including a retaining member sufficiently flexible so as to be manually flexed*

*(a) from a biased, panel retaining condition for holding the upper windshield panel in its closed position adjacent to the front support posts; and*

*(b) into a flexed condition for releasing the upper windshield panel into its open position and for moving the upper windshield panel into its closed position*

*(c) said retaining member having at least one hand grip formed therewith for receiving pressure applied by a user's thumb or forefinger to facilitate movement of said retaining member from the panel retaining condition to the flexed condition.*

*24. A retainer clip formed of a flexible, resilient material for holding an upper windshield panel of a split windshield assembly in a closed position adjacent to first and second front support posts of a recreation vehicle, said retainer clip being adapted for releasably retaining the upper windshield panel in its closed position, said retainer clip including a retaining member flexible to the extent of at least 90 degrees so as to be manually flexed*

*(a) from a biased, panel retaining condition for holding the upper windshield panel in its closed position adjacent to the front support posts; and*

*(b) into a flexed condition for releasing the upper windshield panel into its open position and for moving the upper windshield panel into its closed position*

*(c) said retaining member having at least one hand grip formed therewith for receiving pressure applied by a user's thumb or forefinger to facilitate movement of said retaining member from the panel retaining condition to the flexed condition.*

*25. A retainer clip formed of a flexible, resilient material for holding an upper windshield panel of a split windshield*

*assembly in a closed position adjacent to first and second front support posts of a recreation vehicle, said retainer clip being adapted for releasably retaining the upper windshield panel in its closed position, said retainer clip including a retaining member and having an integrally-formed flexible binge to permit said retaining member to be manually flexed*

(*a*) *from a biased, panel retaining condition for holding the upper windshield panel in its closed position adjacent to the front support posts; and*

(*b*) *into a flexed condition for releasing the upper windshield panel into its open position and for moving the upper windshield panel into its closed position*

(*c*) *said retaining member having at least one hand grip formed therewith for receiving pressure applied by a user's thumb or forefinger to facilitate movement of said retaining member from the panel retaining condition to the flexed condition.*

*26. A retainer clip formed of a flexible, resilient material for holding an upper windshield panel of a split windshield assembly in a closed position adjacent to first and second front support posts of a recreation vehicle, said retainer clip being adapted for releasably retaining the upper windshield panel in its closed position, said retainer clip including a retaining member sufficiently flexible so as to be manually flexed*

(*a*) *from a biased, panel retaining condition for holding the upper windshield panel in its closed position adjacent to the front support posts; and*

(*b*) *into a flexed condition for releasing the upper windshield panel into its open position and for moving the upper windshield panel into its closed position*

(*c*) *said retaining member having at least one hand grip formed therewith for receiving pressure applied by a user's thumb or forefinger to facilitate movement of said retaining member from the panel retaining condition to the flexed condition.*

*27. A retainer clip formed of a flexible, resilient rubber material for holding an upper windshield panel of a split windshield assembly in a closed position adjacent to first and second front support posts of a recreation vehicle, said retainer clip being adapted for releasably retaining upper windshield panel in its closed position, said retainer clip including a retaining member sufficiently flexible so as to be manually flexed*

(*a*) *from a biased, panel retaining condition for holding the upper windshield panel in its closed position adjacent to the front support posts; and*

(*b*) *into a flexed condition for releasing the upper windshield panel into its open position and for moving the upper windshield panel into its closed position*

(*c*) *said retaining member having at least one hand grip formed therewith for receiving pressure applied by a user's thumb or forefinger to facilitate movement of said retaining member from the panel retaining condition to the flexed condition.*

* * * * *